US006403503B1

(12) United States Patent
Weinberg

(10) Patent No.: US 6,403,503 B1
(45) Date of Patent: Jun. 11, 2002

(54) FIBERGLASS CLOTH RESIN TAPE INSULATION

(76) Inventor: Martin Weinberg, 167 Fairview Ave., Stamford, CT (US) 06902

(*) Notice: Subject to any disclaimer, the term of this patent is extended or adjusted under 35 U.S.C. 154(b) by 0 days.

(21) Appl. No.: 08/052,671

(22) Filed: Apr. 27, 1993

Related U.S. Application Data

(62) Division of application No. 07/878,408, filed on May 4, 1992, now Pat. No. 5,274,196.

(51) Int. Cl.[7] .............................. H01F 5/06; B32B 7/12

(52) U.S. Cl. ........................ 442/149; 442/150; 442/180; 174/121 R; 174/121 SR; 174/122 G

(58) Field of Search ................................ 428/268, 290, 428/265; 174/121 R, 121 SR, 122 G; 442/180, 149, 150

(56) References Cited

U.S. PATENT DOCUMENTS 2,539,329 A * 1/1951 Sanders ....................... 117/65
2,691,694 A * 10/1954 Young .................... 174/121 R
3,867,758 A * 2/1975 Johnson ....................... 29/605
3,997,122 A * 12/1976 Helfand et al. ................ 242/1
4,018,962 A * 4/1977 Pedlow .................... 428/268 X
4,761,520 A * 8/1988 Wade, Jr. et al. ....... 174/121 R
4,868,035 A * 9/1989 Weinberg et al. ........... 428/212
5,118,558 A * 6/1992 Mater et al. ............ 428/265 X
5,274,196 A * 12/1993 Weinberg ............... 174/121 R

* cited by examiner

*Primary Examiner*—Daniel Zirker
(74) *Attorney, Agent, or Firm*—William W. Jones

(57) ABSTRACT

An improved electrical insulation tape is formed from a sheet of fiberglass cloth having a layer of thermoplastic resin bonded thereto. The thermoplastic resin layer is applied to the fiberglass sheet by melting the resin while contacting the fiberglass, and then the composite is cooled to bond the two components together. The composite sheet is then slit into tapes with substantially no unraveling of the fiberglass component at the slit edges of the tapes. The resultant tapes are easily wrapped on, and adhered to, conductors, such as magnet wire, or the like, by remelting and resolidifying the thermoplastic layer. The tape possesses excellent dielectric properties and heat dissipation properties. Alternatively, the fiberglass sheet may be impregnated with the melted thermoplastic component whereby a composite, rather than a relatively definitive two layer laminate, is formed.

1 Claim, 1 Drawing Sheet

FIBERGLASS CLOTH RESIN TAPE INSULATION

This is a division of copending U.S. Ser. No. 07/878,408, filed May 4, 1992, now U.S. Pat. No. 5,274,196.

FIELD OF THE INVENTION

This invention relates to an improved electrical insulating tape and a method of forming same. The tape of this invention includes a woven fiberglass cloth component bonded to a thermoplastic resin component whereby one surface of the tape is woven fiberglass cloth, and the opposite surface is thermoplastic resin. Alternatively, the fiberglass cloth can be impregnated with the thermoplastic resin.

DESCRIPTION OF RELATED ART

One product which has been widely commercially used for a number of years as an insulation for magnet wire is a combination fiberglass-polyester yarn which is formed from a mixture of fiberglass strands and polyester strands. This insulation yarn is sold by Owens/Corning, and others. This material is widely used at present to insulate magnet wire, but it has several drawbacks which have been accepted by the industry due to the lack of a competing product which avoids these drawbacks while providing equivalent electrical insulating qualities at competitive cost. The problems with the polyester-fiberglass yarn insulation include the rate at which it can be wound onto a wire. This insulation yarn will typically be wound or wrapped onto the wire at a rate of about 15–20 feet per minute. This yarn creates only about a 10 mil width of coverage on the wire when wrapped thereon, thus the relatively slow rate at which it can be wound onto a wire. Another drawback relates to the fact that this insulation will bond to the wire, and is not easily strippable therefrom. In fact, it must be ground off of the wire, if the wire is to be stripped. The fibers are also susceptable to being bunched together, even when double wrapped, whereby gaps in the insulation can form. When single wrapped, gaps occur due to uneven distribution of yarn fibers. This problem requires double wrapping layers at different angles of wrap, about 90 degrees difference between overlying layers.

U.S. Pat. No. 2,691,694 granted Oct. 12, 1954 to H. R. Young discloses insulated electrical conductors in which a three layer insulation is used. The first layer wrapped directly onto the conductor is a polytetrafluoroethylene (PTFE) film tape. A PTFE powder is suspended in water and is then impregnated into a glass fiber tape which is then wrapped onto the conductor over the PTFE film. A final outer layer of glass yarn is either wrapped or braided onto the PTFE impregnated glass fabric layer. The composite is heated to high enough temperatures to fuse the PTFE. The PTFE will not fuse unless it is subjected to high temperatures (above 600 degrees F.), and high pressures concurrently. This insulated product is very time consuming to make, given the fact that there are three layers required, and that the last layer is a glass yarn layer which is wrapped or braided onto the conductor, the latter step being itself an extremely slow process. The resultant insulation does however include a resin film part, and a glass yarn or braid component.

The aforesaid patent to H. R. Young refers to U.S. Pat. No. 2,539,329, granted Jan. 23, 1951 to P. F. Sanders for instructions as to how the glass/PTFE insulation is produced. The Sanders patent describes a method for making an insulation tape having a woven fiberglass carrier part and a PTFE part layered onto the fiberglass carrier. A water/PTFE slurry is formed, and the fiberglass cloth is dipped Into the slurry to form a thick layer of PTFE powder. There are three dipping steps, and three intermediate water evaporation and calendering steps which result in a thick, crack-free layer of PTFE on the glass substrate. The sheet will then be heated to a temperature of 700 degrees F. to fuse the PTFE particles to form a coherent layer of PTFE. The fusing step can be performed either prior to, or subsequent to, a slitting of the cloth into tapes suitable to be wound on an electrical conductor wire. It will be appreciated that the Sanders teaching is merely a teaching of a method for forming PTFE insulation strips. The glass component is insignificant and is only used as a carrier for the PTFE since glass has the ability to withstand the fusing temperatures of the PTFE. The PTFE is present in at least a 5:1 ratio to glass. The Sanders process requires extremely high temperatures and numerous preparation steps simply to produce a PTFE insulation tape.

U.S. Pat. No. 3,867,758 granted Feb. 25, 1975 to D. B. Johnson relates to a method for making glass insulated electrical coils. A wide sheet of glass strands which are all parallel, with no crossing strands are united together by passing the strands through an enamel bath to coat all of the strands with enamel, which are then heated to bake the enamel so as to coherently form the parallel glass strands into a sheet of insulating material. Heat cured polyesters or other similar polymers may be used for the enamel. The sheet is then slit into tapes which are wrapped onto conductor wires. Coils are formed from the wrapped conductor wires, which coils are then impregnated with the enamel and thereafter baked to fuse the windings in the coils to each other. The result may be a polyester and glass insulated conductor.

U.S. Pat. No. 4,761,520, granted Aug. 2, 1988 to I. W. Wade, Jr. et al discloses an insulated magnet wire wherein the wire is first wrapped spirally with a fiberglass yarn, and then over wrapped with a polyester film tape. The tape has two layers of polyester, one being amorphous and being laid against the glass yarn layer, and the other being crystalline. The wrapped wire is then heated sufficiently to cause the amorphous layer to become crystalline and fuse to the glass yam layer. A glass yarn/polyethyleneterephthalate insulation is thus formed. The forming process is however slow since there are two winding steps, one of which involves winding a yam on the wire. The yarn winding step requires a very slow feeding of the wire during production.

U.S. Pat. No. 4,868,035 granted Sep. 19, 1989 to M. J. Weinberg et al discloses a glass/polymer insulation, and a conductor wrapped therewith. The polymer component is a PET film tape having one amorphous surface and one crystalline surface. In one embodiment, the crystalline surface has parallel fiberglass yarn strands adhered to it by an adhesive. The composite insulation may be wrapped onto a conductor with either side facing the conductor. A glass/PET insulation which is fusable to itself or to the conductor is thus disclosed.

It will be appreciated that all of these prior art glass/resin insulations which require multiple wrappings are undesirably slow to produce and expensive. When the multiple wrappings are performed on a single line with a plurality of in-line wrapping assemblies, the slowest wrapping operation will dictate the speed of the entire line. In the prior art procedures which include wrapping of single strand glass yarn, or glass/resin composite yarn layers, the wrapping operation is quite slow. When a heat curing resin is used as the resin component, there will always be required a final resin coat and a subsequent cure step before the wrapping will adhere to the conductor.

When only parallel glass strands are used, the problem of feeding and maintaining the parallelism of the strands is formidable, and if the parallel strands are to be adhered to the resin layer, the use of a separate adhesive can affect the performance of the insulation. When PTFE is used as the resin component, production of the insulation and the insulated conductors requires extremely high temperatures.

SUMMARY OF THE INVENTION

This invention relates to an improved and simplified electrical insulation, and to a method of forming the same into tapes from stock sheets of the insulation material. The insulation of this invention is a ribbon or tape which includes a woven fiberglass component and a thermoplastic resin component. The resin is coated or bonded onto one side of the woven fiberglass component so that one surface of the insulation tape is essentially woven fiberglass, and the opposite surface is essentially a solidified layer of thermoplastic resin. Use of an insulation tape having these opposite surface characteristics yields a number of practical advantages, as will become apparent from the description to follow. When one does not require an insulation having opposite sides with different surface characteristics, the fiberglass cloth can be impregnated with the thermoplastic resin.

In accordance with a preferred embodiment of the invention, a composite heat dissipating electrical insulation tape is provided which comprises a first layer of a thermoplastic resin, preferably a copolymer of polyester, and a second layer of woven fiberglass yarn strands. The woven fiberglass layer is adhered to the thermoplastic resin layer and the fiberglass yarn strands are held together by the resin layer.

As noted, the tapes are slit from a stock preformed sheet. The preformed sheet is produced by feeding a sheet of woven fiberglass past a bonding station wherein the thermoplastic resin layer is applied to one surface of the fiberglass sheet in molten form. The resin can be extruded in molten form onto the fiberglass as the fiberglass sheet passes beneath an extruder; or curtain coated in a slurry onto the fiberglass as the fiberglass sheet passes beneath a curtain coater; or the fiberglass sheet could be overlain with a film of the thermoplastic resin, which would then be heated to its melting point to flow onto the fiberglass sheet. If curtain coating is used, the resin in the slurry would be melted by a heating step with the slurry carrier therein evaporated at the same time. In any case, the fiberglass/molten resin composite is subsequently cooled to form a solidified layer of thermoplastic resin on the woven fiberglass sheet. The extruding or curtain coating alternative is the preferred method due to its lower cost. A surfactant such as silane can be applied to the surface of the fiberglass sheet to be coated prior to casting the resin thereon, in order to improve the wetting of the glass fiber by the molten thermoplastic. The silane surfactant actually saturates, ie, completely coats the woven fibers of the fiberglass cloth. This will provide a better glass/resin bond in the end product. When the resin component is solidified on the fiberglass, the resin forms an adjunct bond between all of the fibers of the glass fabric. This adjunct bond is strengthened because the resin will flow to a certain extent into the interstices of the glass fabric and cover the overlaps of the weft and warp knuckles of the cloth. The fabric itself is thus strengthened by the resin coating.

After the stock sheet of fiberglass cloth and resin is formed and cooled, the composite sheet can be slit into tapes as narrow as one-quarter inch. The resultant tapes will possess the enhanced strength of the stock composite, and will exhibit minimal edge fraying. The reason for the enhanced strength is that the knuckles between the warp and weft threads of the woven cloth are bonded together by the flexible resin layer. This result does exist in the prior art fiberglass/resin composite tapes, but the resins in the prior art tapes are not thermoplastic resins, and therefore are very difficult to work with. The glass fabric/thermoplastic resin tapes can then be formed into suitable traverse wound spools for use on automatic wire wrapping equipment such as that shown in U.S. Pat. No. 3,997,122, granted Dec. 14, 1976.

Any of the variety of dielectric thermoplastic copolymer resins known in the art may be used in making the insulating tape of the invention. Preferably, the thermoplastic resin is a copolymer of polyester such as PET, or polyethylene terephthalate glycol (PETG), but a number of other resin copolymers such as: polyamide, polypropylene, polycarbonate, or nylon copolymers, or mixtures thereof, for example, could be used. The thermoplastic resin component must not have a melting point above about 550 degrees F. PETG copolymer resin, which has a melting point of about 525 degrees, and which is manufactured by Tennessee Eastman is particularly preferred. When PETG is used and the polyester component is laid against the conductor wire, the resultant wrapped wire displays an unexpected stability when subjected to wire elongation tests. Conductor wires wrapped with the aforesaid prior art polyester/glass yarn insulation sold by Dow Corning, when subjected to standard elongation tests, display insulation cracks and flaking at about a 22% wire elongation threshold.

Wire wrapped with the PETG insulation of this invention when the polyester component is laid against the wire, by contrast, exhibits no insulation cracking, flaking, or delamination at up to 40% insulated wire elongation. This characteristic is believed to result from the tenacious bond of the PETG to the wire. In the aforesaid prior art products, the polyester yarn component does not evenly and fully contact the conductor wire. The 40% elongation factor is also the practical elongation limit for a copper conductor, after which the copper conductor will fracture.

In practicing the invention, the tape may be wrapped spirally or longitudinally over the electrical conductor. The tape, whether wrapped spirally or longitudinally, may be overlapped to varying degrees, or may be disposed in abutting relationship depending on which side of the tape faces the conductor. The tape is preferably relatively thin, for example from about 0.001 to about 0.025 inch thick.

In those applications in which it is desirable or necessary to produce an insulated conductor to which the insulation is permanently bonded (and is thus difficult to strip off), the thermoplastic resin/glass cloth composite tape is applied to the conductor with the resin surface on the inside, facing the conductor. Upon the application of sufficient heat needed to melt the resin layer the resin will bond to the conductor during wrapping, with subsequent cooling.

Alternatively, when an overlapping wrap procedure is used, either spiral or longitudinal, the fiberglass cloth surface of the tape may be placed on the inside, facing the conductor. Application of sufficient heat necessary to melt the thermoplastic resin component will bond the overlapping parts of the fiberglass layer to the overlapped parts of the resin layer with subsequent cooling. Care must be taken so as not to heat the thermoplastic resin to a temperature which will result in flow of the resin through the fiberglass to the conductor. This technique is suitable for making easily strippable insulated conductors. A more flexible wire will also result due to the fact that the insulation "floats" on the conductor.

Pursuant to the preferred embodiment of the invention, a thermoplastic polyester resin, as generally described above, is used in combination with a layer of woven fiberglass yarn strands to provide a composite electrical insulating and heat dissipating tape. Thus in accordance with the invention, an electrical conductor is provided having an insulation comprising: a thermoplastic polyester (or other comparable resin) layer; and a woven fiberglass cloth yarn strand layer bonded to a surface of the polyester layer. Preferably, the woven fiberglass cloth layer will be 5 mils or less in thickness so as to minimize the thickness of the composite insulating tape.

The advantages deriving from the use of the fiberglass cloth layer are three-fold. First, the fiberglass cloth imparts strength and durability to the composite insulation. Secondly, and more importantly, by virtue of the heat conductive properties of the fiberglass, it serves the additional function of enhancing the dissipation of heat which is generated by the flow of current through the conductor. Thirdly, and quite importantly, the presence of the glass cloth component ensures that should environmental heat encountered during use of the insulated wire cause burnout of the resin component thereof, then the resultant air gaps created in the wrap will be preserved by the glass cloth component. Thus the electrical insulating capability of the wrap will not degrade to the point of electrical failure. Due to the woven nature of the glass component, the aforesaid improved Insulation qualites will be maintained, and gaps cannot occur in the wrapped conductor.

The invention will be more readily appreciated by reference to the accompanying drawings, in which:

DESCRIPTION OF THE PREFERRED EMBODIMENT

Figure 1:
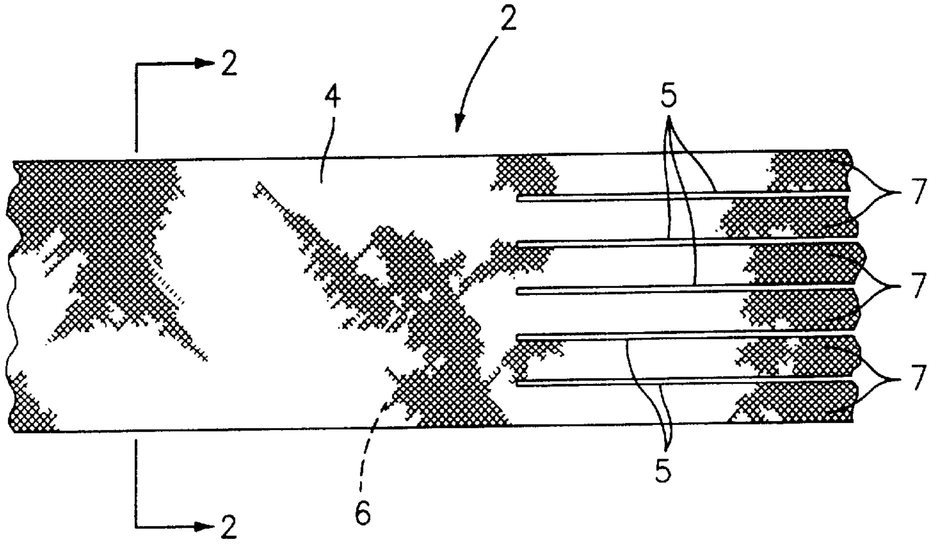
FIG. 1 is a plan view of a section of a preferred embodiment of a preformed of a stock sheet from which an electrical insulating tape formed in accordance with this invention is slit.
Figure 2:
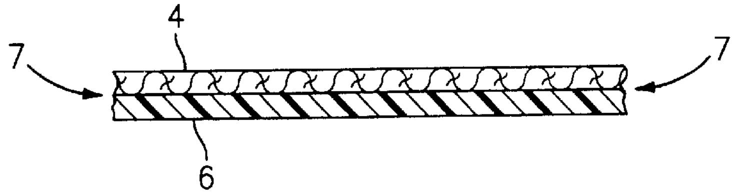
FIG. 2 is a sectional view of the-sheet of FIG. 1 taken along line 2—2 of FIG. 1.
Figure 3:
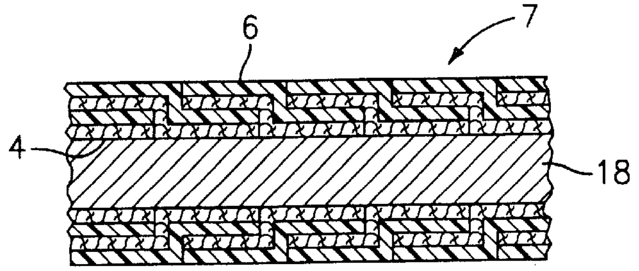
FIG. 3 is a sectional view of a conductor wire wrapped with the tape formed from the sheet of FIGS. 1 and 2, the view being taken along the axis of the wrapped conductor, and the fiberglass layer being disposed against the conductor.

Referring now to the drawings, there is shown in FIG. 1 a stock sheet denoted generally by the numeral 2 of fiberglass cloth/PETG resin from which the insulating tapes are cut. The sheet 2 has the woven fiberglass yarn cloth 4 adhered to the thermoplastic PETG layer 6. FIG. 1 shows how the sheet 2 is slit along lines 5 to form the tapes 7. It will be noted from FIG. 2 that approximately half of the thickness of the tape 7 is provided by each of the fiberglass cloth component 4 and the thermoplastic PETG component 6. It will also be noted that one side of the tape 7 is essentially PETG and the other side is essentially fiberglass cloth. FIG. 3 shows an electrical conductor wire 18 wrapped with the insulation tape of FIG. 2. The tape 7 is wrapped in a spiral fashion having about a 50% overlap. The fiberglass cloth surface 4 of the tape 7 faces toward the conductor wire 18, and the PETG surface 6 of the tape 7 faces away from the conductor wire 18. The overlapped portions of the PETG side 6 which abut the fiberglass surface 4 thus can be bonded to the fiberglass surface 4 merely by heating the wrapped conductor to the melting point of the PETG with subsequent cooling of the wrapped wire. Once bonded, the PETG surface 6 of the tape 7 bonds to the fiberglass cloth which thereby prevents future unraveling of the fiberglass cloth from the insulated conductor. This form of the insulation wrap exhibits easy stripability, and excellent heat dissipation.

Figure 4:
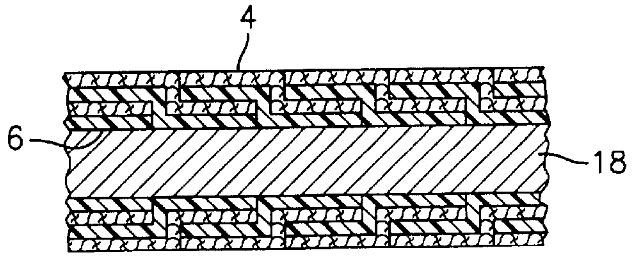
FIG. 4 is a view similar to FIG. 3 but with the resin layer being disposed against the conductor.

FIG. 4 is a view similar to FIG. 3 but showing the PETG layer 6 toward the conductor 18. The fusion of the PETG layer 6 to the fiberglass layer 4 is accomplished in the manner specified above, and the only major difference from the insulated product shown in FIG. 3 is that the insulation will not be so easily strippable from the conductor 18. It will be appreciated that the conductor can be wrapped longitudinally, rather than spirally.

The improved fiberglass/polyester insulation tape disclosed herein can be used to insulate a wide-ranging variety of electrical current-conducting bodies or structures, including low-voltage wiring, high voltage cables and a variety of electrical devices, including motors and generators.

The tape, instead of having separate fiberglass and PET copolymer layers, could be made from a single woven cloth product which has a warp (longitudinal) component formed substantially of fiberglass and a weft (transverse) component formed substantially of, thermoplastic resin fibers. This embodiment of the tape can be applied to the conductor and then heated to melt the weft thermoplastic component to bond the insulation to the conductor with subsequent cooling. Alternatively, the woven cloth composite could be heated and cooled prior to slitting into tapes whereby the fiberglass/thermoplastic-impregnated sheet would be formed. The sheet could then subsequently be slit into tapes.

In addition to excellent dielectric and other known properties, deriving from the use of polyester, or another thermoplastic dielectric resin therein, the insulation of this invention has additional desirable features. One of the desirable features is the fact that the insulation can be used in one of two different orientations on the conductor which will produce different physical characteristics in the insulated conductor. The invention affords numerous advantages to manufacturers and end users. For example, there are no solvents or chemical handling or processing steps required. The insulation tapes can be wrapped at higher line speeds as compared to yarn insulation. Longitudinal or spiral wrapping on round, square or rectangular conductors can be performed, all using high speed technology. The insulation can be bonded on the conductor with resistive, radiant, or induction heating procedures. The use of PETG, with its amorphous state, allows significantly higher wrapping line speeds, as high as 125 feet per minute. Integrity of corner edge coverage on square and rectangular conductor wires can be substantially improved. Varnish encapsulation may be eliminated, and consistant coverage is attained over the entire wire.

The foregoing description is provided to highlight and illustrate the preferred embodiments of the invention. It will become readily apparent that various modifications and adaptations can be made within the scope of the invention as defined by the appended claims.

What is claimed is:

1. An electrical insulating material in sheet or tape form, said material having a woven cloth component which includes fiberglass strands, and a bondable component consisting essentially of polyethylene terephthalate glycol thermoplastic resin, said resin being bonded to the fiberglass strands and being present in amounts operable to bond overlapping knuckles of the woven fiberglass together and to prevent significant fraying of cut edges of said sheet or tape, and to form a remeltable and resolidifiable bondable thermoplastic surface on the cloth.

* * * * *